US009075854B2

(12) United States Patent
Thomas et al.

(10) Patent No.: US 9,075,854 B2
(45) Date of Patent: Jul. 7, 2015

(54) BROWSER BASED DATABASE MANIPULATION

(75) Inventors: Les Thomas, Los Gatos, CA (US); Eric Jacobson, San Jose, CA (US); Wesley Powell, San Jose, CA (US); Edward L. Ford, Santa Clara, CA (US); Gang Zhang, Fremont, CA (US); Adam Ward, San Jose, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 12/941,027

(22) Filed: Nov. 5, 2010

(65) Prior Publication Data

US 2012/0117121 A1 May 10, 2012

(51) Int. Cl.
*G06F 17/30* (2006.01)

(52) U.S. Cl.
CPC ................................ *G06F 17/30557* (2013.01)

(58) Field of Classification Search
CPC ............... G06F 3/0486; G06F 2203/04808; G06F 3/04842; G06F 9/4443; G06F 17/30398; G06F 17/30893; G06F 17/3056; G06F 17/30873; G06F 17/3089; G06F 3/0481; G06F 17/24; G06F 17/50; G06F 8/38; Y10S 707/99943
USPC ...................... 707/790, 796, 805, 999.1, 803; 717/721, 113; 715/769, 234, 237, 243, 715/780, 788
See application file for complete search history.

(56) References Cited

U.S. PATENT DOCUMENTS

| | | | |
|---|---|---|---|
| 6,546,397 B1 | 4/2003 | Rempell | |
| 7,080,084 B2* | 7/2006 | Yoshimura et al. | 1/1 |
| 7,603,375 B2* | 10/2009 | Ng et al. | 1/1 |
| 7,725,501 B1* | 5/2010 | Stillman et al. | 707/805 |
| 8,577,929 B2* | 11/2013 | Boley et al. | 707/803 |
| 8,914,422 B2* | 12/2014 | Hale et al. | 707/805 |
| 2002/0023111 A1* | 2/2002 | Arora et al. | 707/513 |
| 2003/0074634 A1 | 4/2003 | Emmelmann | |
| 2004/0205529 A1* | 10/2004 | Poulose et al. | 715/506 |
| 2006/0036994 A1* | 2/2006 | Englefield et al. | 717/104 |
| 2006/0069994 A1* | 3/2006 | Weidner, Jr. | 715/700 |
| 2006/0080616 A1* | 4/2006 | Vogel et al. | 715/769 |
| 2006/0112349 A1* | 5/2006 | Clow et al. | 715/780 |
| 2006/0212822 A1* | 9/2006 | Facemire et al. | 715/769 |
| 2007/0006088 A1* | 1/2007 | Bales et al. | 715/769 |
| 2007/0074130 A1* | 3/2007 | Folting et al. | 715/792 |
| 2007/0113194 A1* | 5/2007 | Bales et al. | 715/769 |
| 2007/0282869 A1* | 12/2007 | Paulus et al. | 707/100 |
| 2007/0288890 A1* | 12/2007 | Wells | 717/113 |
| 2008/0005683 A1 | 1/2008 | Aoki | |
| 2008/0109715 A1* | 5/2008 | Stover | 715/237 |
| 2008/0126944 A1 | 5/2008 | Curtis et al. | |

(Continued)

*Primary Examiner* — Dennis Truong
(74) *Attorney, Agent, or Firm* — Fish & Richardson P.C.

(57) ABSTRACT

Methods, program products, and systems implementing browser-based database manipulation are described. A browser on a client device can receive a form definition that is generated based on a schema of a relational database and a layout. The schema in the form definition can specify properties of data fields. The browser can display the data fields and other components of the layout in a list. The browser can receive a drag-and-drop input, the drag-and-drop input selecting a data field or a layout component from the list and dropping the selected data field or layout component in a drop zone in a form area in the browser. The browser can determine the drop location, and use the drop location as a parameter to modify the form definition. The layout and the schema can be modified based on the modified form definition.

15 Claims, 7 Drawing Sheets

(56) References Cited

U.S. PATENT DOCUMENTS

2010/0325601 A1* 12/2010 Turner et al. .................. 717/101
2011/0246538 A1* 10/2011 Boley et al. ................... 707/805
2013/0198684 A1* 8/2013 Boley et al. ................... 715/788

* cited by examiner

BROWSER BASED DATABASE MANIPULATION

TECHNICAL FIELD

This disclosure relates generally to database architecture.

BACKGROUND

A relational database can include a set of relations, frequently known as tables. A table in the relational database can include a set of data elements or values that are organized using vertical columns and horizontal rows. The table can have a specified number of columns and a variable number of rows. Each column can have a data type that defines what category of data can be stored in the column. A row of a table can include one or more data fields. Each data field can correspond to a column, and have a data type that corresponds to the data type of the column. The type of a data column can be defined by a database schema, which can be a data model that defines how data in the relational database are represented or accessed.

A formatted view of data can be generated based on a layout. The layout can include an arrangement of data fields in the schema, objects, pictures, and layout parts. The layout can represent a way information is organized and presented when a user browses, previews, or prints data records. The user can design different layouts for entering data, printing reports and mailing labels, or displaying web pages.

SUMMARY

Methods, program products, and systems implementing browser-based database manipulation are described. A browser on a client device can receive a form definition that is generated based on a schema of a relational database and a layout. The schema in the form definition can specify properties of data fields. The browser can display the data fields and other components of the layout in a list. The browser can receive a drag-and-drop input, the drag-and-drop input selecting a data field, a relation, a static object, or a layout component from the list and dropping the selected data field or layout component in a drop zone in a form area in the browser. The browser can determine the drop location, and use the drop location as a parameter to modify the form definition. The layout and the schema can be modified based on the modified form definition.

These and other implementations can be utilized to achieve one or more of the following advantages. A database layout or a schema can be edited in a browser environment, anywhere and anytime. A user can use a browser as an integrated environment for data browsing and database design. For example, the user browsing database data with a browser can change the way in which the data are laid out on the fly. In addition, the browser-based database manipulation can enable a collaborative work environment, where multiple people can work on a same layout or database schema.

The details of one or more implementations of browser-based database manipulation are set forth in the accompanying drawings and the description below. Other features, aspects, and advantages of browser-based database manipulation will become apparent from the description, the drawings, and the claims

BRIEF DESCRIPTION OF THE DRAWINGS

Like reference symbols in the various drawings indicate like elements.

DETAILED DESCRIPTION

Browser-Based Database Manipulation Overview

Figure 1:
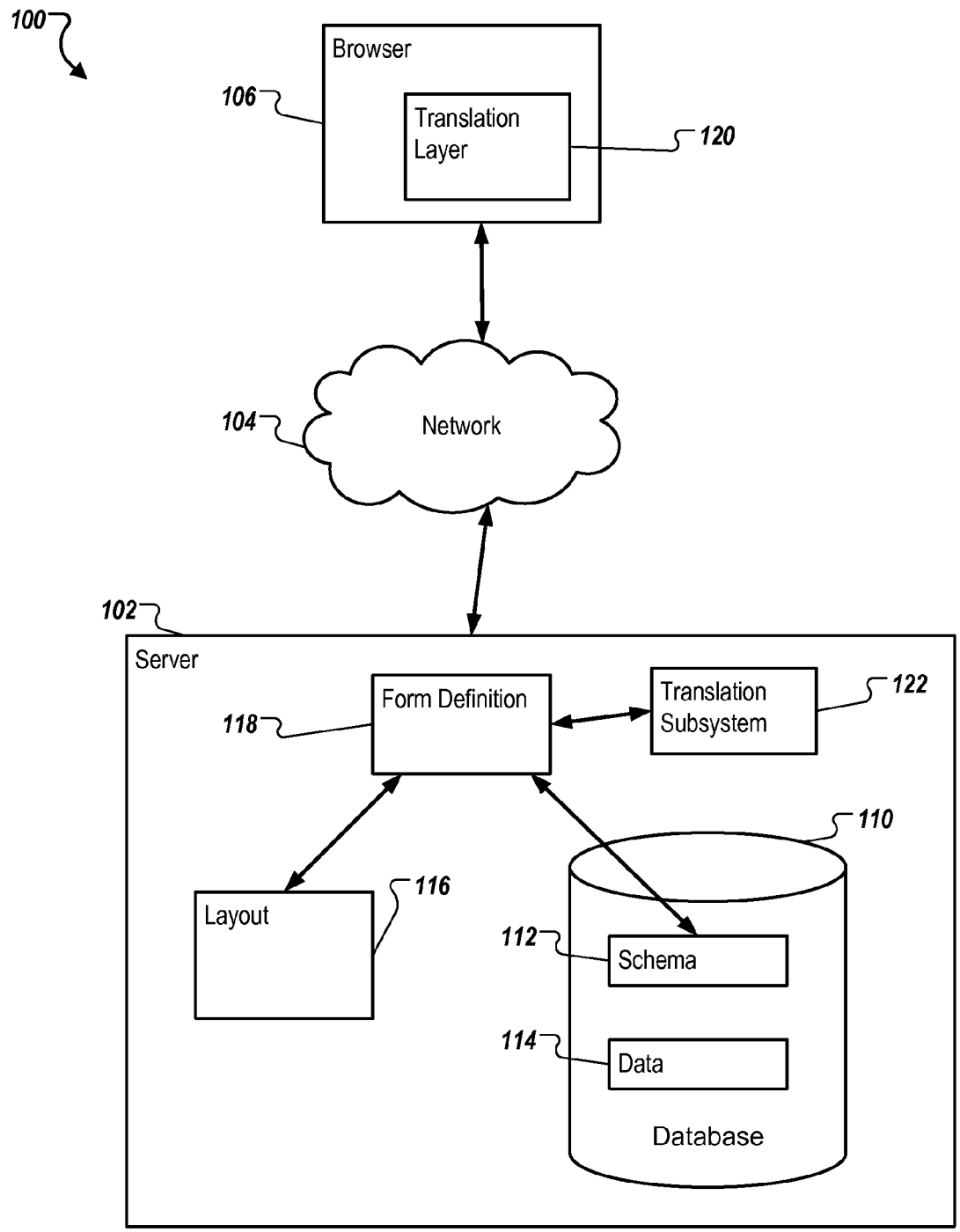
FIG. 1 is a block diagram illustrating an exemplary system implementing the features and operations of browser-based database manipulation.

FIG. 1 is a block diagram illustrating exemplary system 100 implementing the features and operations of browser-based database manipulation. System 100 can allow a user to manipulate a layout, a schema, or both, from browser 106 without using a dedicated database editing application program. System 100 can allow the user to select and arrange data fields and static content (e.g., static text or image) in browser 106.

System 100 can include a client device connected to server 102 through communications network 104. Browser 106 can execute on the client. Browser 106 can include a software application for retrieving, presenting, and modifying information provided through communications network 104.

The information can include data provided by server 102. Server 102 can include or be coupled to database 110. Database 110 can include schema 112 and data 114. Schema 112 can include definitions of attributes (e.g., names, types, or sizes) of various data fields. Data 114 can include one or more rows of data records, or no data records. Layout 116 can include definitions of display properties of the data record. In some implementations, layout 116 can include one or more templates for formatting data 114. For example, layout 116 can include a product catalog template that defines a theme for displaying product information. The theme can include, for example, default font size and type, display background, and groups and subgroups. Form definition 118 can include at least a portion of the display properties specified by layout 116 and at least a portion of the data attributes of schema 112.

Browser 106 can retrieve information from database schema 112 and layout 116 stored in form definition 118. Form definition 118 can be stored on server 102 or on the client. Browser 106 can retrieve the attributes (e.g., names, types, and sizes) of data records from form definition 118. Browser 106 can display data fields by name in a list. In some implementations, browser 106 can display attributes of each data field in the list. Browser 106 can be configured to receive a drag-and-drop input to drag a data field from the list and drop the data field represented by the label to a location in a window of browser 106. In addition to data fields, relations, static data objects, or layout objects can be dragged and dropped. Upon receiving a "save" input, translation layer 120 can translate the location into a formatting parameter of the data field. The formatting parameter can be stored in form definition 118. In various implementations, translation layer 120 can be a plug-in of browser 106 or a script written in a scripting language (e.g., JavaScript®).

In some implementations, browser 106 can provide a container for placing one or more data fields. The container can include a template of layout 116 that provides a theme of the container. For example, form definition 118 received by browser 106 can include a display specification including formatting configuration and placement information of various data fields. Browser 106 can display data fields formatted according to the formatting configuration and placement information as defined in form definition 118. In some implementations, server 102 can include translation subsystem 122. Translation subsystem 122 can translate form definition 118 into a web page (e.g., one or more files written in a markup language) that includes or is coupled with various scripts.

Figure 2:
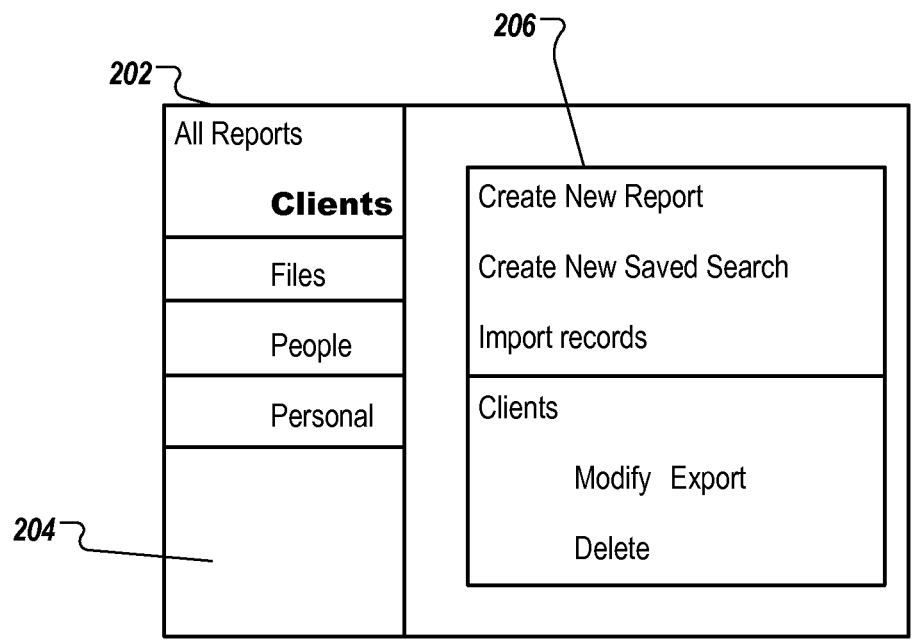
FIG. 2 illustrates an exemplary user interface for creating a data definition for a collection.

FIG. 2 illustrates exemplary user interface 202 for creating a data definition for a collection. A collection can include an organized set of data, for example, a data table, a view of a data table, a report, or a saved search. User interface 202 can be displayed in a browser (e.g., browser 106 described in reference to FIG. 1). User interface 202 can include a collection listing portion 204 that can list one or more collections. Each collection can include one or more data records that, if displayed, are formatted using a layout that corresponds to the collection. The layout can be transformed from column metadata. The layout can include a theme specific to the collection. The data records of the collection can include rows of one or more database tables to be browsed, or data records retrieved from one or more search queries. A user can select a collection (e.g., collection "Clients") for viewing and editing.

User interface 202 can include a collection manipulation dialog box 206. Collection manipulation dialog box 206 can include controls (e.g., clickable text or images) that can accept an input to create a new collection or to import data records into a collection (e.g., from a file stored on a client device). A data definition can be created when an input is received. Collection manipulation dialog box 206 can include controls for manipulating a selected collection for modification, export, or deletion.

Figure 3:
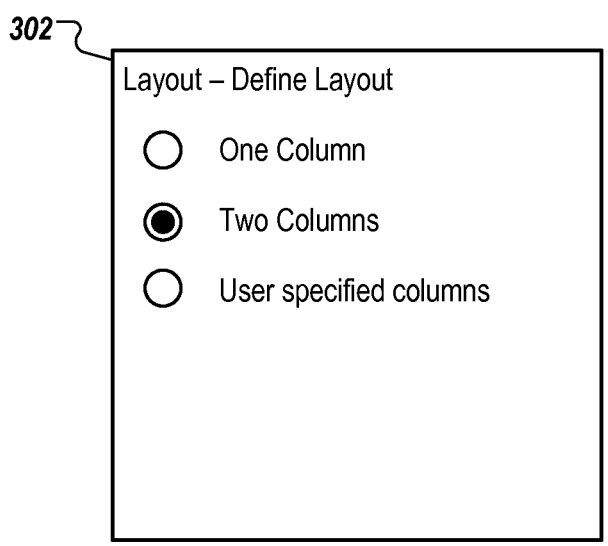
FIG. 3 illustrates an example user interface for configuring a layout in a browser.

FIG. 3 illustrates exemplary user interface 302 for configuring a layout in a browser. User interface 302 can be configured to receive an input from a user for configuring ways to partition a layout. For example, a selection input can be configured to receive input specifying a one-column layout, a two-column layout, or a layout having a user specified number of columns. A column in a layout can be configured to display one or more form objects in a vertical stack, or no form objects. Likewise, a selection input can be configured to receive input specifying a number of rows in a layout. A form object can include a data field, a static object, or a relationship to be displayed in a browser. Form objects will be discussed in further details below in reference to FIG. 6.

If a layout is already created, user interface 302 can be used to change a number of columns of the layout. If the layout has two columns, upon receiving an input selecting a one-column layout, the layout can change into a one-column format. Form objects located in the second layout column can be moved into the first layout column (e.g., to the bottom). The second layout column can be deleted. If the layout has one column, upon receiving an input selecting a two-column layout, a second layout column can be created. The second layout column can be configured to display no form object until an object is added by a user.

Figure 4:
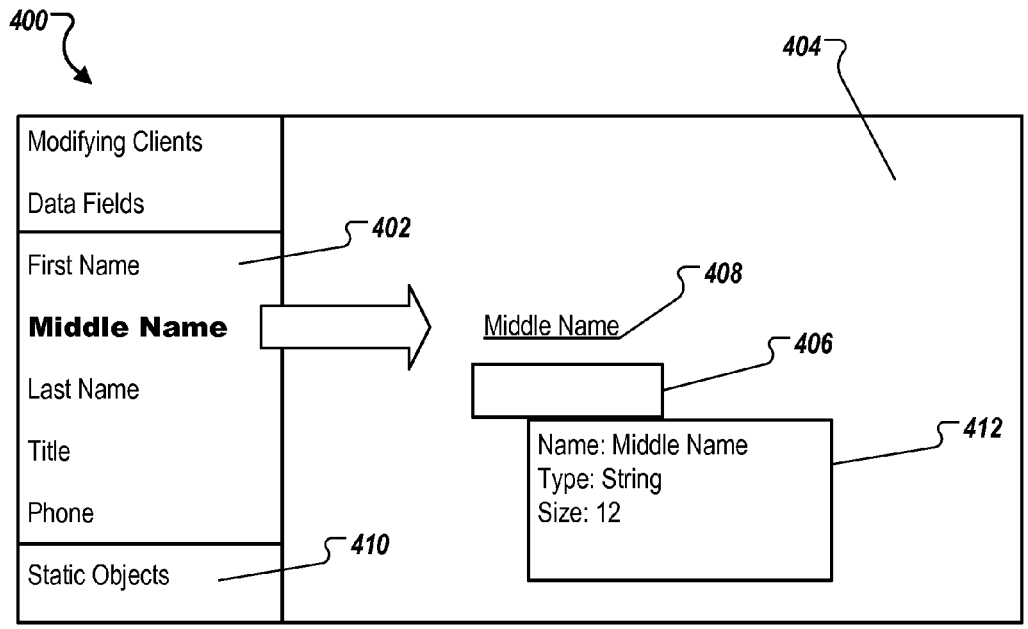
FIG. 4 illustrates an exemplary user interface for adding a form object to a layout.

FIG. 4 illustrates exemplary user interface 400 for adding a form object to a layout. User interface 400 can be a web page displayed in a browser. User interface 400 can include data field listing area 402, in which a list of data fields from a collection can be displayed. The data fields can be displayed in data field listing area 402 by name. At least some of the data fields in the list can be dragged and dropped in form area 404 of user interface 404. Form area 404 can correspond to a layout.

Those data fields that can be dragged and dropped can be highlighted (e.g., using bold font). Some data fields can be prohibited from being dragged and dropped (e.g., data fields already in form area 404). The data fields prohibited from being dragged and dropped can be disabled. A data field in data field listing area 402 can receive a selection (e.g., a click-and-hold). The data field can be dragged into form area 404 and be dropped (e.g., released from the hold) at a location corresponding to the drop.

After the drop, the data field can occupy data field area 406. System data 408 relating to the data field (e.g., data field name) can be automatically placed in form area 404 at fixed positions (e.g., above data field area 406). The fixed positions can include configurable options (e.g., above, below, or next to data field area 406). Data field area 406 can be constrained by a column of the layout. A placement restriction can be associated with form area 404. The placement restriction can limit a number of times a data field can appear in form area 404.

Data field area 406 or system data 408, as displayed in form area 404, can be configured to receive an input to change an attribute of the data field. For example, a selection event (e.g., a mouse-over or a mouse click) of data field area 406 can cause attribute editing pane 412 to be displayed. Attribute editing pane 412 can be configured to receive inputs editing an attribute (e.g., a name, a type, or a size) of the data field as specified in a database schema. Edited attributes can be stored in the form definition and be used to modify the database schema.

Data fields in the list displayed in data field listing area 402 can have at least the following types: a text type, a number type, a data type, a time type, a date and time type, a true/false (checkbox) type, a choice list type, a multi-paragraph text type, and address type, and image type, and a file type.

Data fields in the list displayed in data field listing area 402 can include a composite data field. The composite data field can include, for example, data field having an image type, a file type, or an address type. The composite data field can be associated with a layout specific to the composite data field. For example, in an address field, a layout can specify that a name be displayed in a first line, an address line 1 be displayed in a second line, an address line 2 be displayed in a third line, and a state and postal code be displayed in a fourth line. A composite data field can be displayed in form area 404 according to the layout associated with the composite data field.

In addition to data fields, static form objects can be dragged and dropped into form area 404. Static object listing area 410 can display a list of static form objects. Static form objects can include static content that can improve usability by allowing data to be grouped, and by allowing instructional text to the groups. Static form objects can be persistent on a form, regardless of what record is in view. Static form objects can include static text objects, spacer objects, and divider objects. Static text objects can include instructional text or header. If dragged and dropped into form area 404, a static text object can be configured to receive input for entering content of the static text and input for choosing a text size (e.g., a regular text size or a header text size). Spacer objects can be used to add spaces (e.g., vertical spaces) between form objects. Divider objects can be used to add dividers (e.g., horizontal dividers) between form objects to present a distinct division.

Figure 5:
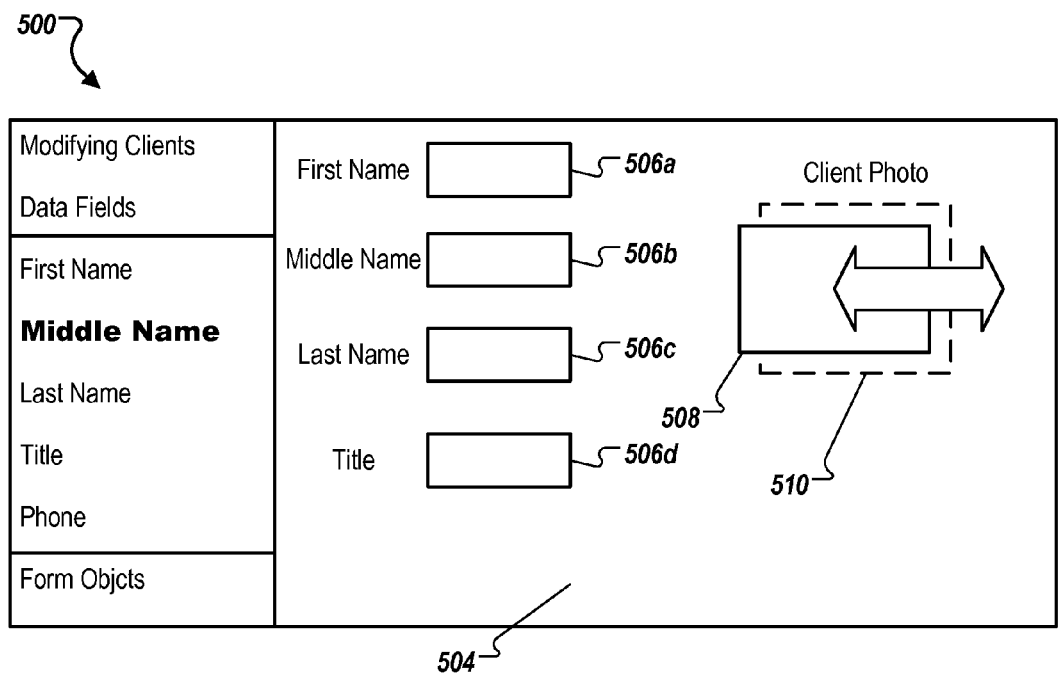
FIG. 5 illustrates an exemplary user interface for manipulating data fields in a browser environment.

FIG. 5 illustrates exemplary user interface 500 for manipulating data fields in a browser environment. User interface 500 can include form area 504 that can accept an input to manipulate display properties of data fields.

Form area 504 can display a two-column layout. In a left column, data fields 506a, 506b, 506c, and 506d can be displayed. In a right column, data field 508 can be displayed. Data field 508 can be an image field that is configured to display an image. Each of the data fields can be moved. For example, data field 508 can receive a selection input (e.g., a click-and-hold). Image field 508 can be moved (e.g., dragged) to a location while being held. Upon a drop input (e.g., release of the hold), data field 508 can be placed at a new location. When data field 508 is dragged, a box with the same dimension of the data field 508 can be displayed in form area 504. The box can be translucent. The box can be used to indicate what the layout will look like after the drop.

When data field 508 is dragged, drop zone 510 can be displayed. Drop zone 510 can be displayed when data field 508 moves to a location where a drop can occur. For example, the two-column layout can require data objects be aligned. Drop zone 510 can be displayed at a display area aligned with other data objects in a column when data field 508 is dragged proximate to the location (e.g., when the translucent box and the location have an overlap that exceeds a threshold value). When data field 508 is dragged, the drop zone can move within form area 504, following data field 508. Other data fields (e.g., data fields 506a, 506b, 506c, and 506d) can be rearranged in relation to data field 508 that is being dragged.

Controls can be associated with each data field 506a, 506b, 506c, 506d or 508. The controls can include a delete control and an edit control. The delete control can include a button that, when clicked, causes the data field or image field associated with the button to be deleted from form area 504. The edit control can include an attribute panel that can receive inputs to modify attributes of the data field or layout component associated with the attribute panel. The controls and the drag-and-drop operations can be enabled or disabled based on a user's privileges. The privileges can include database privileges and layout editing privileges. The database privileges can include privileges specifying whether the user can access a specific database, table, or data field, or whether the user can access or modify a schema of the database. The layout editing privileges can include privileges to access and change a layout, or privileges to propagate the change to other users.

Exemplary Data Structures

Figure 6:
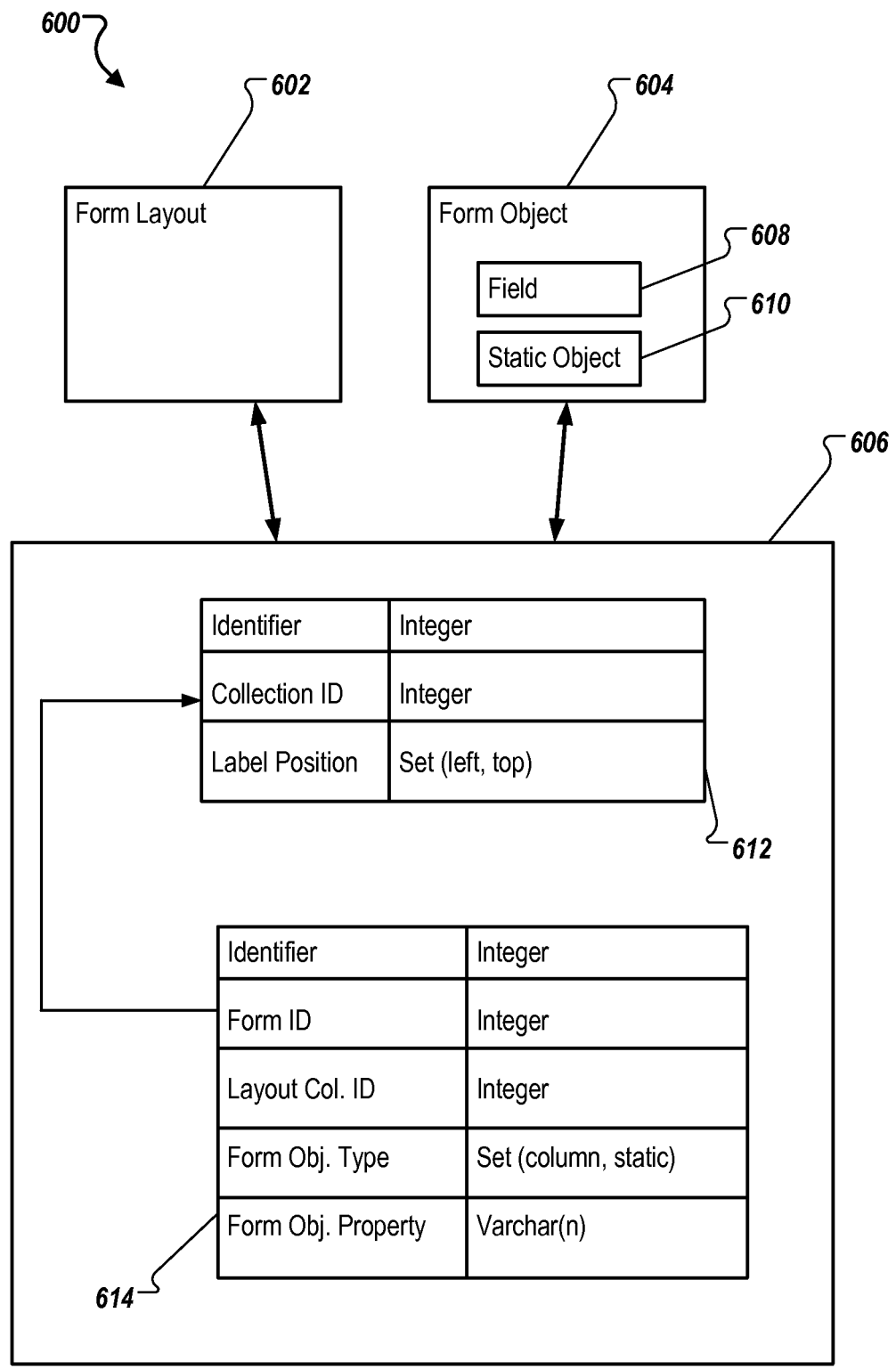
FIG. 6 illustrates an exemplary data structure for form definition used in data field manipulation.

FIG. 6 illustrates exemplary data structure 600 for form definition used in data field manipulation. Data structure 600 can include form layout object 602 and form object 604 that can be implemented on an application server. Data structure 600 can include data model 606 that can be implemented on a data server. Form layout object 602 and form object 604 can interact with data model 606 through one or more database operations. Form layout object 602 can encapsulate attributes defining a form.

The "formObjects" variable of List 1 can include a multidimensional array. An outer array of the variable can include layout columns. An inner array can include one or more form objects 604 within the layout column. The number of layout columns in the form can be based on a size of the outer list. An order of the form objects in the inner list can dictate an ordering of the objects in the layout column.

Form object 604 can be an interface for identifying objects that can be included in a form and for configuring layout specific properties on the objects. The "FormLayoutProperty" type can include enumerated values for specifying a height, a text size, and a white space type of the object. Data field object 608 and static object 610 can implement an interface for a form object.

Data model 606 can represent one or more collections. Each collection can have one or more forms. Each form can have one or more attributes. Each form can include one or more data fields or static form objects (e.g., static text objects, spacer objects, or divider objects). Each form object can belong to a layout column. Each form object can belong to an ordered sequence. Form table 612 and form layout table 614 can be used to persist (e.g., store on a non-volatile medium) data of a form layout. Each work group of users can correspond to a set of form table 612 and form layout table 614.

Form table 612 can store data including a collection identifier, a layout type, and a label position. The collection identifier can identify a collection to which a form is related. The collection can include a set of one or more data records. The collection can correspond to a collection.

Form layout table 614 can store information related to a column layout. Form layout table 614 can include an identifier data field, which can be used to designate a visual sequence of form objects in the layout. A layout column identifier can specify a column of each form object. Form layout table 614 can include a form object type data field to specify the type. The form object type values can include a form field type and a static form field type. The form object property can specify one or more display properties of the object. The property can be delimited by a delimiter (e.g., vertical bar "|"). Exemplary form object types and properties are shown below in table 1.

TABLE 1

Exemplary Form Object Type and Property

| Type | Property |
| --- | --- |
| formField | Column_ID=1 \| presentationType=TEXT |
| staticFormField | type=static_text \| size=MEDIUM \| text=Following are the personal data describing . . . |

Exemplary Processes

Figure 7:
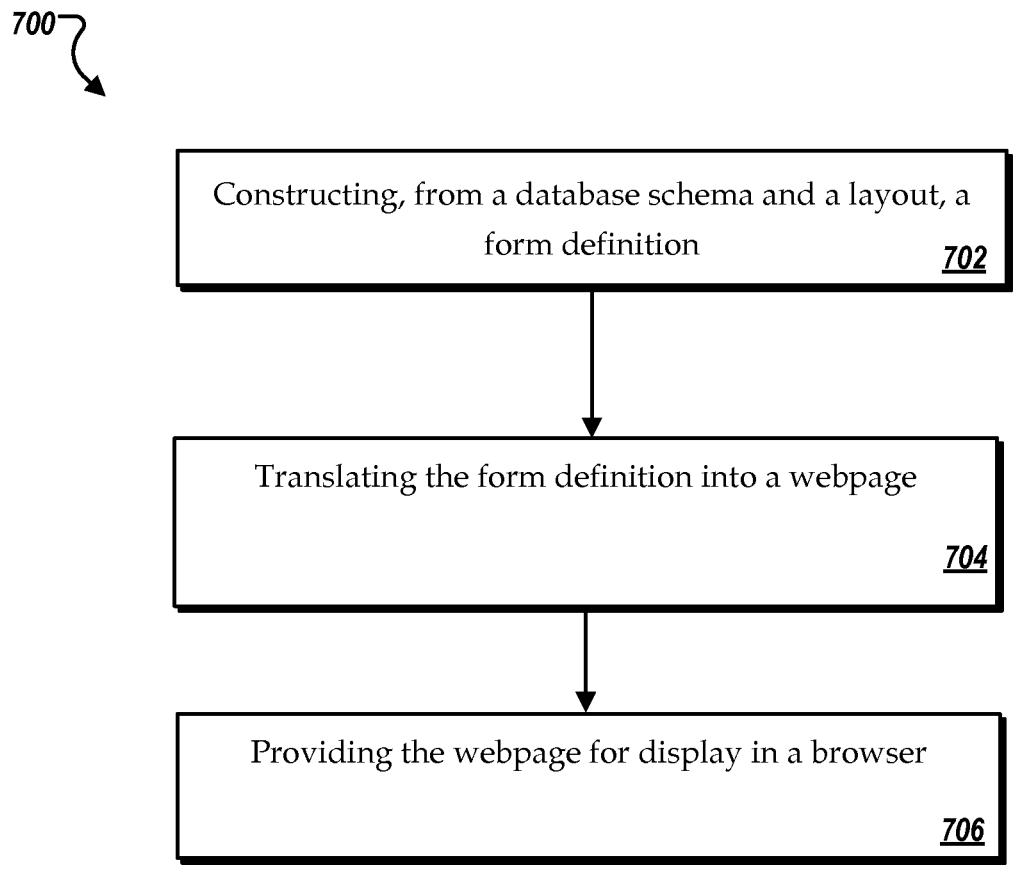
FIG. 7 is a flowchart illustrating a first exemplary process of browser-based data manipulation.

FIG. 7 is a flowchart illustrating exemplary process 700 of browser-based data manipulation. Process 700 can be executed by a system including one or more data processing devices.

The system can construct (702), from a database schema and a layout, a form definition. The form definition can include a data definition defining a property of a data field and a layout definition defining a location of the data field in the layout. The data field can include a composite data field, the composite data field including a plurality of data fields in a relational database.

The system can translate (704) the form definition into a webpage. The webpage can be configured to receive an input on the data field to manipulate the data definition in the database schema and the location of the data field in the layout. Translating the form definition into the webpage can include formatting the webpage, including placing the data field at a location in the webpage according to the layout. Translating the form definition into the webpage can include generating one or more scripts to receive the input manipulating the data field. The input can include at least one of a drag-and-drop input, an insert field input, a delete field input, and a change field property input.

The system can provide (706) the webpage for display in a browser. In some implementations, process 700 can include receiving an updated form definition from the browser. In response to the updated form definition, the system can update the database schema when the updated form definition includes a component changing the database schema. The system can update the layout when the updated form definition includes a component changing the layout. In some implementations, process 700 can include providing a notification to the browser when the database schema or the layout changes.

Figure 8:
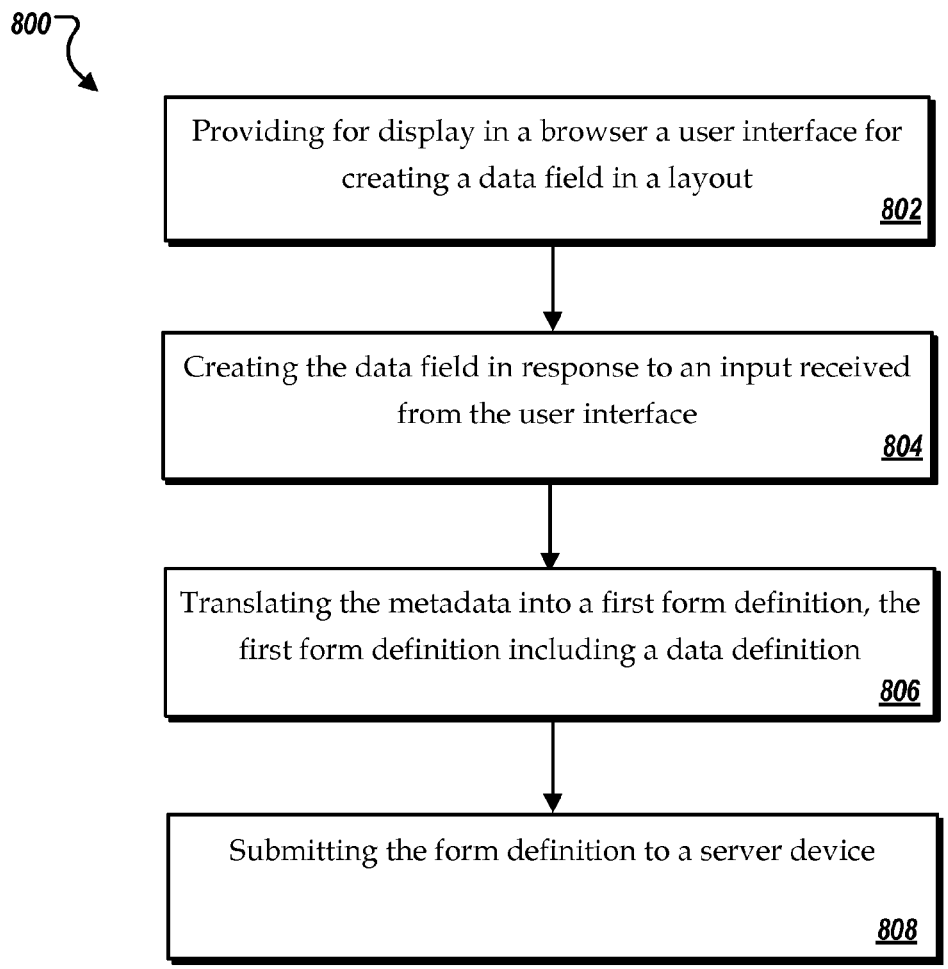
FIG. 8 is a flowchart illustrating a second exemplary process of browser-based data manipulation.

FIG. 8 is a flowchart illustrating exemplary process 800 of browser-based data manipulation. Process 800 can be executed by a system including one or more data processing devices.

The system can provide (802) for display in a browser a user interface for creating a data field in a layout. The user interface can be configured to receive an input specifying metadata of the data field. The metadata can include a first location of the data field and one or more attributes of the data field.

The system can insert (804) the data field in the layout in response to an input received from the user interface. The data field, although defined in a database schema, may not have been defined in the layout. After the data field is created in the layout, the data field can be associated with display properties specified in the metadata.

The system can translate (806) the metadata into a first form definition. The first form definition can include a data definition describing database properties (e.g., name, type, and size) of the data field. The first form definition can include a first layout definition specifying the first location of the data field in a layout. Translating the first location into the first form definition can include receiving the first location from the browser as coordinates in relation to the browser. The system can map the coordinates into coordinates in the layout. The system can designate the coordinates in the layout as the layout definition.

The system can submit (808) the form definition to a server device. Submitting the form definition to the server device can include submitting the data definition to the server device following existing data definitions in the form definition.

In some implementations, process 800 can include receiving a move field input through the user interface. The move field input can be a drag-and-drop input specifying that the data field is to be moved from the first location to a second location. The system can translate the second location into a second form definition including a second layout definition describing the second location of the data field in the layout. The system can submit the second form definition to the server device. Submitting the second form definition to the server device can include determining that the second layout definition is different from the first layout definition and that the data definition is unchanged. In response, the system can submit the second layout definition to the server device without submitting the data definition.

Exemplary System Architecture

Figure 9:
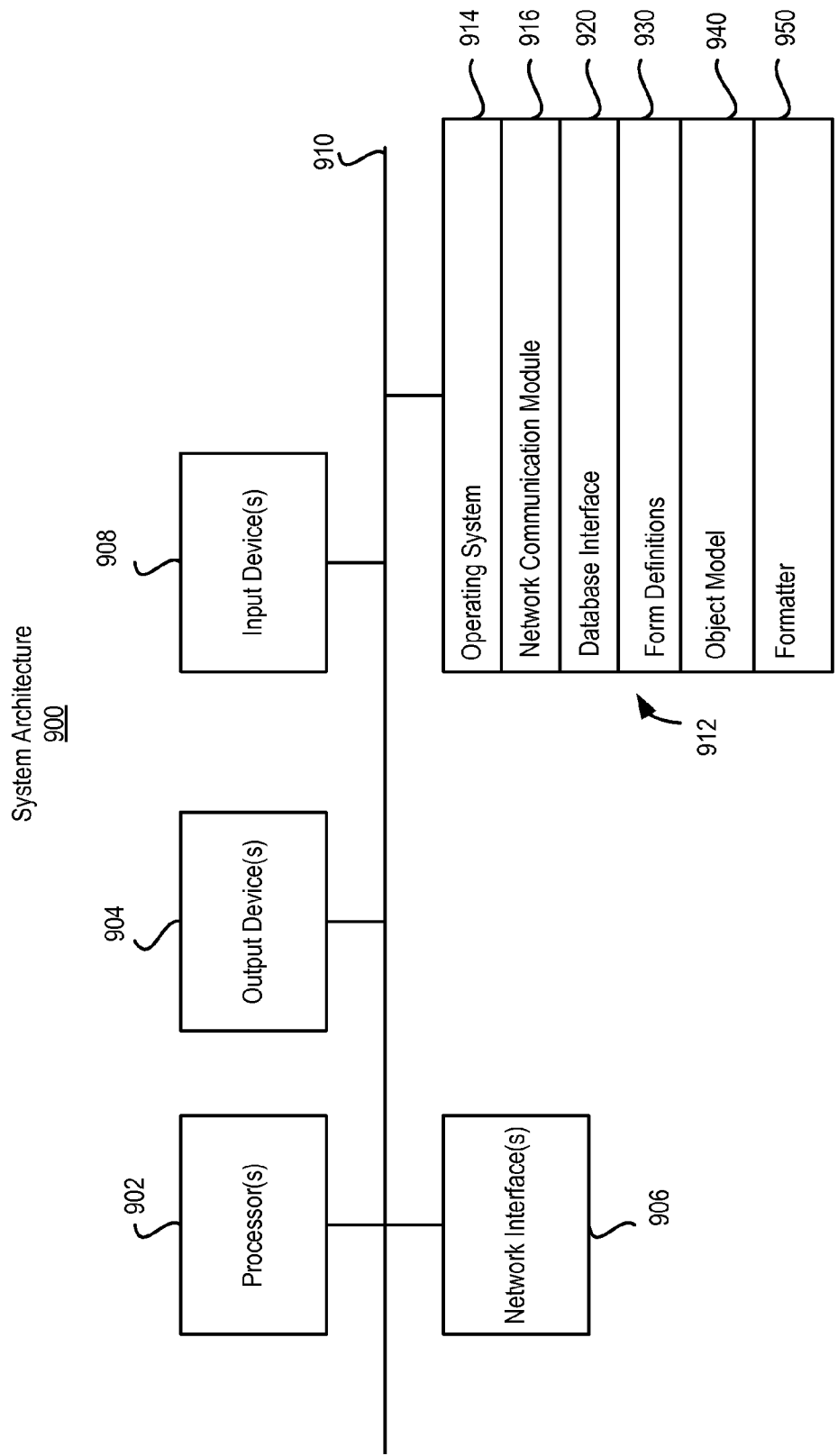
FIG. 9 is a block diagram of an exemplary system architecture for implementing the features and operations of FIGS. 1-8.

FIG. 9 is a block diagram of an exemplary system architecture 900 for implementing the features and operations of FIGS. 1-8. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to any medium that participates in providing instructions to processor 902 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 912 can further include operating system 914 (e.g., Mac OS® server, Windows® NT server), network communication module 916, database interface 920, form definitions 930, object model 940, and formatter 950. Database interface 920 can provide one or more user interfaces, interfaces between a server computer and a client computer, and interfaces between a relational database and other application program. Form definition 930 can include information relating a layout to one or more data fields as defined in a database schema. Form definition 930 can be manipulated using an input received from a web browser. Object model 940 can include various translation functions translating the form definition into a webpage and converting an input received from the webpage into a form definition. Formatter 950 can include functions of presenting data records (e.g., rows of data in a database) according to form definition 930.

Operating system 914 can be multi-user, multiprocessing, multitasking, multithreading, real time, etc. Operating system 914 performs basic tasks, including but not limited to: recognizing input from and providing output to devices 904 and 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.). Database interface 920 can interface to various databases including relational databases.

Architecture 900 can be included in any device capable of hosting a database application program. Architecture 900 can be implemented in a parallel processing or peer-to-peer infrastructure or on a single device with one or more processors. Software can include multiple software components or can be a single body of code.

The described features can be implemented advantageously in one or more computer program products that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

What is claimed is:

1. A method executed by one or more data processing devices, the method comprising:
    constructing a form definition from a database schema and a layout, the form definition including a data definition defining a property of a data field and a layout definition defining one or more locations of one or more data fields in the layout;
    translating the form definition into a webpage for display in a browser, the webpage comprising a data field listing area and a form area, the data field listing area including a representation of the data field, the form area displaying a plurality of data fields of a data record and being formatted according to the layout;
    in response to receiving, from the browser, an input moving the representation of the data field from the data field listing area of the webpage to a user-specified location in the form area of the webpage, rearranging at least a portion of the plurality of displayed data fields of the data record to make room for a drop zone for placing the data field while the representation of the data field is being moved in the browser; and
    upon receiving an input placing the representation of the data field in the drop zone, updating the form definition, including designating, in the form definition, a location of the drop zone as a location of the data field, wherein, in the form area, a value of the data record corresponding to the data field is displayed at the location; and
    providing a webpage that reflects the updated form definition for display in the browser, including, upon receiving an input causing the webpage to display a new data record, displaying a value of the new data record corresponding to the data field at the location.

2. The method of claim 1, where the representation of the data field includes an identifier of the data field, and translating the form definition into the webpage comprises:
    placing the identifier of the data field in the data field listing area; and
    generating one or more scripts to receive the input moving the identifier of the data field.

3. The method of claim 2, where:
    the input includes at least one of a drag-and-drop input, an insert field input, and a change field property input, and
    the drop zone includes a translucent box that moves following the input moving the representation of the data field.

4. The method of claim 1, further comprising:
    updating the database schema when the updated form definition includes a component changing the database schema.

5. The method of claim 1, further comprising:
    providing a notification to the browser upon determining that the database schema or the layout changes.

6. The method of claim 1, where the data field includes a composite data field, the composite data field including a plurality of data fields in a relational database.

7. A non-transitory storage device storing a computer program product, the computer program product operable to cause one or more processors to perform operations comprising:
    constructing a form definition from a database schema and a layout, the form definition including a data definition defining a property of a data field and a layout definition defining one or more locations of one or more data fields in the layout;
    translating the form definition into a webpage for display in a browser, the webpage comprising a data field listing area and a form area, the data field listing area including a representation of the data field, the form area displaying a plurality of data fields of a data record and being formatted according to the layout;
    in response to receiving, from the browser, an input moving the representation of the data field from the data field listing area of the webpage to a user-specified location in the form area of the webpage, rearranging at least a portion of the plurality of displayed data fields of the data record to make room for a drop zone for placing the data field while the representation of the data field is being moved in the browser; and
    upon receiving an input placing the representation of the data field in the drop zone, updating the form definition, including designating, in the form definition, a location of the drop zone as a location of the data field, wherein, in the form area, a value of the data record corresponding to the data field is displayed at the location; and providing a webpage that reflects the updated form definition for display in the browser, including, upon receiving an input causing the webpage to display a new data record, displaying a value of the new data record corresponding to the data field at the location.

8. The non-transitory storage device of claim 7, where the representation of the data field includes an identifier of the data field, and translating the form definition into the webpage includes:

formatting the webpage, including placing the data field in the webpage according to the layout; and generating one or more scripts to receive the input manipulating the data field.

9. The non-transitory storage device of claim 8, where:

the input includes at least one of a drag-and-drop input, an insert field input, a delete field input, and a change field property input, and the drop zone includes a translucent box that moves following the input moving the representation of the data field.

10. The non-transitory storage device of claim 7, the operations further comprising:

updating the database schema when the updated form definition includes a component changing the database schema.

11. A system comprising:

one or more processors; and a non-transitory storage device storing a computer program product, the computer program product operable to cause the one or more processors to perform operations comprising:

constructing a form definition from a database schema and a layout, the form definition including a data definition defining a property of a data field and a layout definition defining one or more locations of one or more data fields in the layout;

translating the form definition into a webpage for display in a browser, the webpage comprising a data field listing area and a form area, the data field listing area including a representation of the data field, the form area displaying a plurality of data fields of a data record and being formatted according to the layout;

upon receiving, from the browser, an input moving the representation of the data field from the data field listing area of the webpage to a user-specified location in the form area of the webpage, rearranging at least a portion of the plurality of displayed data fields of the data record to make room for a drop zone for placing the data field while the representation of the data field is being moved in the browser; and upon receiving an input placing the representation of the data field in the drop zone, updating the form definition, including designating, in the form definition, a location of the drop zone as a location of the data field, wherein, in the form area, a value of the data record corresponding to the data field is displayed at the location;

and providing a webpage that reflects the updated form definition for display in the browser, including, upon receiving an input causing the webpage to display a new data record, displaying a value of the new data record corresponding to the data field at the location.

12. The system of claim 11, the operations further comprising:

updating the database schema when the updated form definition includes a component changing the database schema.

13. The method of claim 1, comprising, upon receiving an input placing the representation of the data field in the drop zone, rearranging other data fields to accommodate the data field.

14. The non-transitory storage device of claim 7, the operations comprising, upon receiving an input placing the representation of the data field in the drop zone, rearranging other data fields to accommodate the data field.

15. The system of claim 11, the operations comprising, upon receiving an input placing the representation of the data field in the drop zone, rearranging other data fields to accommodate the data field.

* * * * *

UNITED STATES PATENT AND TRADEMARK OFFICE
CERTIFICATE OF CORRECTION

PATENT NO. : 9,075,854 B2  
APPLICATION NO. : 12/941027  
DATED : July 7, 2015  
INVENTOR(S) : Les Thomas et al.

Page 1 of 1

It is certified that error appears in the above-identified patent and that said Letters Patent is hereby corrected as shown below:

On the title page, Column 1, Line 1 (Title); Delete "BROWSER BASED" and insert
-- BROWSER-BASED --, therefor.

In the specification

Column 1, Line 1 (Title); Delete "BROWSER BASED" and insert -- BROWSER-BASED --, therefor.

Signed and Sealed this
Eighth Day of December, 2015

Michelle K. Lee
*Director of the United States Patent and Trademark Office*